Patented Jan. 13, 1931

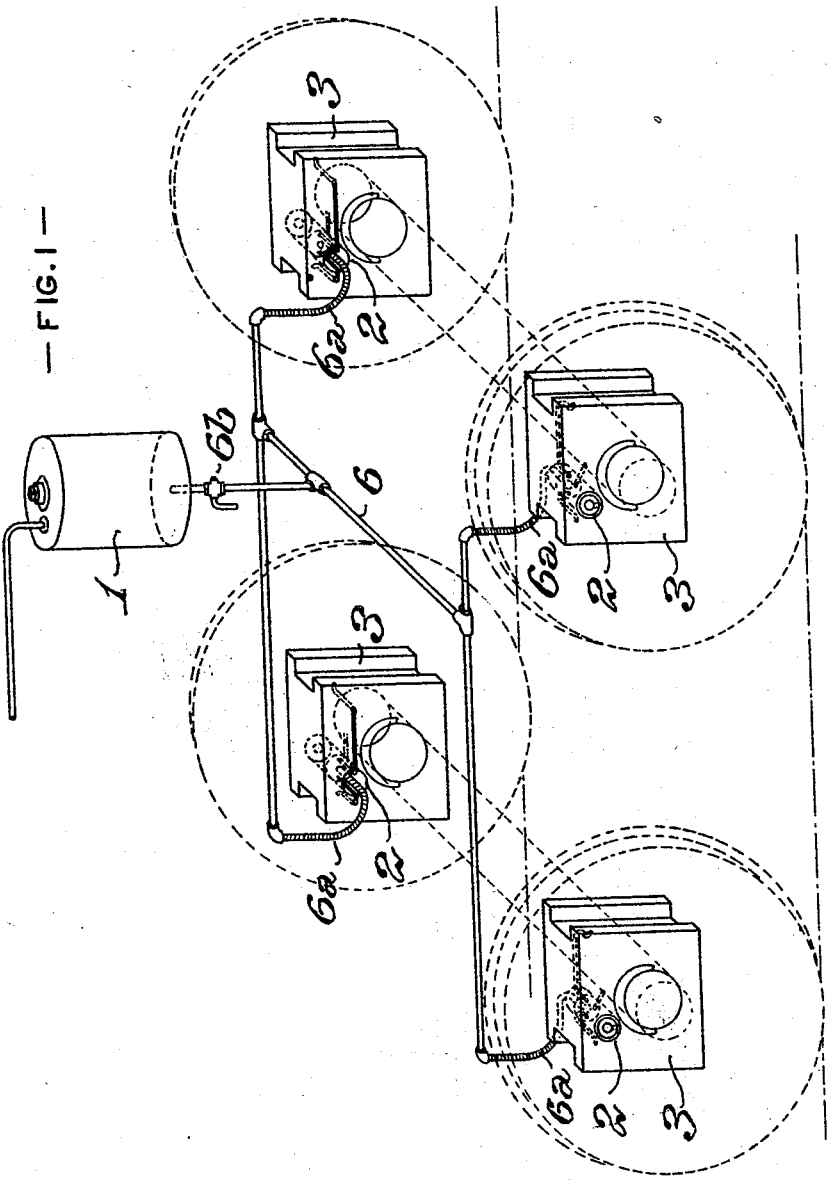

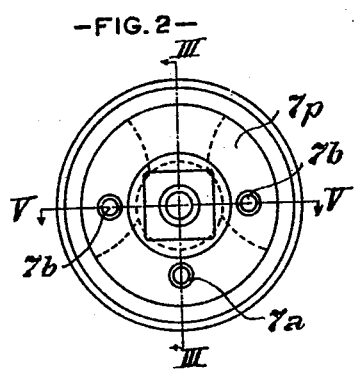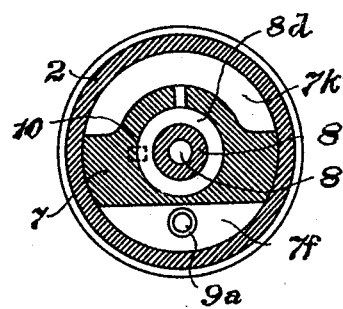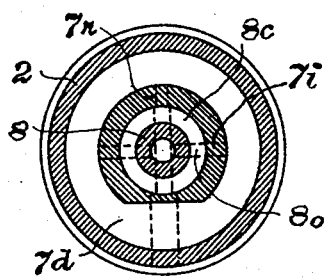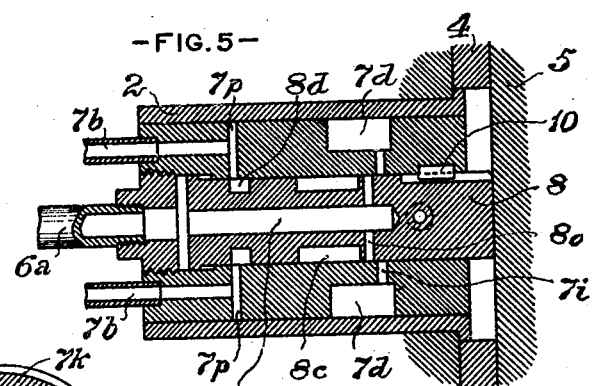

1,789,266

UNITED STATES PATENT OFFICE

WALTER C. ROCKENSTIRE, OF SCHENECTADY, NEW YORK

JOURNAL-BOX LUBRICATOR

Application filed June 13, 1928. Serial No. 284,969.

This invention relates, generally, to the accessories of axles of railroad vehicles, and particularly to means for lubricating the journal boxes of the wheels thereof. The object of the invention is to provide a simple, efficient, inexpensive, readily applicable, and automatically operative appliance, whereby such lubrication may be effectively conducted.

The improvement claimed is hereinafter fully set forth.

In the accompanying drawings: Figure 1 is a diagrammatic view, in perspective, illustrating an application of the invention in a railroad vehicle; Fig. 2, an end view, in elevation, and on an enlarged scale, of a journal box lubricator embodying the invention; Figs. 3 and 4, vertical longitudinal sections through the same, on the line III—III of Fig. 2; Fig. 5, a similar section, on the line V—V of Fig. 2; and, Figs. 6, 7, and 8, transverse sections, on the lines VI—VI, VII—VII, and VIII—VIII, respectively, of Fig. 3.

In the practice of the invention, referring descriptively to the specific embodiment thereof which is herein exemplified, a lubricant reservoir, 1, is supported in any convenient position on a locomotive, or other railroad vehicle, said reservoir being subject to pressure, controlled by a suitable reducing valve. A lubricator casing, 2, is fixed in each of the journal boxes, 3, to which the invention is applied, said lubricator casings having their faces at one of their ends, adjacent and open to a hub liner, 4, of any suitable and preferred known construction, fitting against the hub, 5, of a wheel of the vehicle. The hub liner does not, in and of itself, form part of the present invention, and is not, therefore, herein at length set forth. Each lubricator casing is connected by a flexible supply conduit, 6a, with a main lubricant supply line, 6, leading from the lubricant reservoir, 1, and controlled by a cock or valve, 6b.

A sleeve, 7, is fitted in each of the lubricator casings, 2, its end further from the hub liner having a central opening, closed by a detachable plug, 7c, and a piston or plunger, 8, is fitted in the sleeve, said plunger protruding through the end of the sleeve adjoining the hub liner. Chambers and passages, hereinafter described, are formed in the sleeve and the plunger. A central passage, 8a, extends through the plunger, 8, said passage communicating, through the plug, 7c, of the sleeve, with one of the flexible supply conduits, 6a. A transverse passage, 8b, is formed in the plunger, said passage being adapted, in the movement of the plunger, to establish communication between a space or chamber, 7d, in the sleeve, 7, provided by a reduction in its diameter, and a passage, 7m, leading into a port, 2e, in the casing, which is continuously open to the face of the hub liner. Another chamber, 7f, is formed in the sleeve, said chamber communicating with the chamber, 7d, before specified, by a port, 7g, controlled by a check valve, 9. The check valve is normally maintained on its seat by a spring, 9a. The plunger, 8, is recessed, adjoining its transverse passage, 8b, to provide a segmental chamber, 8r, on the plunger, which chamber communicates, through a port, 7n, with the chamber, 7d, before specified. The plunger, 8, is also reduced in diameter, to provide an annular chamber, 8d, which communicates with a chamber, 7k, in the sleeve, at the end of the sleeve further from the hub liner.

In order to prevent the plunger from turning in the casing and thereby blocking any ports, a key or pin, 10, is fixed in the sleeve, said pin fitting in a corresponding slot in the plunger.

In the operation of a journal box lubricator embodying the invention, the plunger, 8, normally occupies the position in the sleeve, 7, which is shown in Fig. 3; in which position, lubricant is supplied to the central passage, 8a, of the plunger, and the communicating passages and ports, from the flexible conduit, 6a. When, by inward movement of the plunger to the position shown in Fig. 4, by the pressure of the adjacent wheel hub, 5, upon it, resultant on the lateral displacement of the wheel, the supply of lubricant from the central passage, 8a, to the communicating passages and chambers is cut off, the lubricant trapped therein is delivered therefrom to the surfaces to be lubricated. The lateral oscillations, when the vehicle is operated over track that is principally tangential, may not be sufficiently rapid to effect the entire amount of lubrication necessary for the journal bearing surfaces, but the positive lubrication provided for, past the check valve, 9, will be of advantage in ensuring the access of lubricant to the journal bearing surfaces, when the waste in the lubricant cellar is not in perfect working condition.

It will be seen that the lubricator casing, 2, encloses three chambers or compartments for the reception of lubricant supplied from the reservoir, 1, to the central passage, 8a, of the plunger, 8, these being one, 7d, of annular transverse section, located near the end of the casing adjoining the hub liner; another, 7k, of crescent shape section; and a third, 7f, extending longitudinally and of segmental section. When the plunger stands in normal position, as shown in Fig. 3, the supply of lubricant to said compartments, except compartment 7f, in the sleeve, 7, is in communication with the central passage, 8a, but when the plunger is moved inwardly to the position shown in Fig. 4, by the lateral movement of the wheel hub, lubricant is cut off from the chamber, 7d, by breaking communication between the ports, 8o and 7i, thereto; and to the chamber, 7k, by breaking communication between the ports, 8s and 7s. Lubricant is delivered to the hub liner from the chamber, 7d, through the port, 7n, and passages, 8b, 7m, and 2e; to the pedestal faces, from the chamber 8d, through the passage, 7p, and pipes 7b; and to the main bearing from chamber, 8c, through port, 7u, chamber, 7f, and pipe 7a. Variations in the relative volumes of the pipes and passages will vary the relative amounts of lubricant distributed to the journal bearing, when the parts are in the relation shown in Fig. 3. By increasing pressure on the lubricant sufficient to unseat the check valve, 9, lubricant passes from the chamber, 7d, through the port, 7g, chamber 7f, and pipe, 7a, to the main bearing.

The invention claimed, and desired to be secured by Letters Patent is:

1. The combination of a supply reservoir for lubricant under pressure; a journal box of a railroad vehicle; a lubricator casing, connected to the journal box; a sleeve, fitting in the casing and containing a plurality of lubricant chambers; and a plunger, fitted in the casing and subject to pressure from a wheel hub of the vehicle, said plunger communicating with the supply reservoir and controlling communication between it and the chambers of the sleeve, and delivery of lubricant from the chambers to wearing surfaces of the journal box.

2. The combination of a supply reservoir for lubricant under pressure; a journal box of a railroad vehicle; a lubricator casing, connected to the journal box; a sleeve, fitted in the casing and containing a plurality of lubricant chambers and ports; and a plunger, fitted in the casing and subject to pressure from a wheel hub of the vehicle, said plunger communicating with the supply reservoir, and controlling ports in the casing, through which lubricant passes from the chambers of the sleeve to wearing surfaces of the journal box.

3. The combination of a lubricator casing for a railroad vehicle; a sleeve, fitting therein, and embodying a plurality of chambers and ports, one of said chambers being adapted to be supplied from a reservoir under pressure; a normally spring seated check valve controlling communication between said chamber and another chamber; and a plunger, operable in the casing by pressure from a wheel hub of the vehicle, for effecting delivery of lubricant from the chambers of the sleeve to surfaces of an axle box by controlling ports in the sleeve.

4. In a railroad vehicle, the combination of a source of supply of lubricant; a plurality of surfaces to be lubricated; a vehicle wheel hub; a valve chest and valve, having a plurality of passageways leading to said surfaces, said valve when reciprocated being adapted to cover and uncover the passageways in the chest; a main passageway in said valve for conveying lubricant to said plurality of passageways; a flexible connection between said main passageway and the source of lubricant supply, said valve being in contact with the face of the wheel hub and adapted to be moved thereby in one direction, and automatically returnable, for covering and uncovering the passageway in said chest.

5. In a railroad vehicle, the combination of a source of supply of lubricant under pressure; a surface to be lubricated; a passageway leading from the source of supply to the surface to be lubricated; a wheel hub; and a valve member controlling the passage of lubricant through said passageway, in contact with the hub, and adapted to be moved in one direction to one control position by the pressure of the lubricant and in the opposite direction to another control position, by lateral movement of the hub.

6. In a railroad vehicle, the combination of an axle box; an axle journal therein; a wheel hub; the hub and box being relatively movable in opposite directions longitudinally of the journal; a chamber for a supply of lubricant; a passageway leading from the chamber to the journal; and a valve member for controlling the passage of lubricant through said passageway, in contact with the hub and adapted to be moved during said relative movements thereof from one control position to another, a portion of said passageway passing through the valve member.

7. In a railroad vehivle, the combination of a pair of pedestal jaws; an axle box therein; an axle journal in the axle box; a wheel hub, the hub and box being relatively movable in opposite directions longitudinally of the journal; a chamber for a supply of lubricant; a passageway leading from the chamber to a pedestal jaw face of the axle box; and a valve member for controlling the passage of lubricant through said passageway in contact with the hub and adapted to be moved during said relative movements thereof, from one control position to another, a portion of said passageway passing through the valve member.

8. In a railroad vehcile, the combination of a pair of pedestal jaws; an axle box therein; an axle journal in the axle box; a wheel hub, the hub and box being relatively movable in opposite directions, longitudinally of the journal; a chamber for a supply of lubricant; a passageway leading from the chamber to a pedestal jaw face of the journal box; a passageway leading from the chamber to the journal; and a valve member for controlling the passage of lubricant through said passageways in contact with the hub and adapted to be moved during said relative movements thereof from one control position to another, a portion of each of said passageways passing through the valve member.

9. In a railroad vehicle, the combination of a source of supply of lubricant under pressure; an axle box; a journal therein; a wheel hub; a member having a bore and a lubricant chamber; a passageway leading from the source of lubricant supply to the bore and the chamber; a passageway leading from the chamber to the journal; and a valve member reciprocable in the bore for controlling the passage of lubricant through the passageways, in contact with the hub and adapted to be moved thereby in one direction to one control position, and in the opposite direction to another control position by pressure of lubricant in the bore, a portion of each of said passageways passing through the valve member.

10. In a railroad vehicle, the combination of a source of supply of lubricant under pressure; a surface to be lubricated; a passageway leading from said source of lubricant supply; a passageway leading to said surface to be lubricated and having two inlets for receiving lubricant from said first passageway; a spring pressed valve controlling one of the inlets; a wheel hub; and a valve member through which a portion of said first passageway passes, said valve member engaging the hub for movement thereby in one direction and being returnable in the opposite direction for opening communication between said passageways through the valve controlled inlet.

11. In a railroad vehicle, the combination of a source of supply of lubricant under pressure; a surface to be lubricated; a passageway leading from said source of lubricant supply; a passageway leading to said surface to be lubricated and having an inlet; a spring pressed valve controlling the inlet; a wheel hub; and a valve member through which a portion of said first passageway passes, said valve member engaging the hub for movement thereby in one direction, and being returnable in the opposite direction for opening communication between said passageways through the valve controlled inlet.

12. In a railroad vehicle, the combination of a source of supply of lubricant under pressure; a surface to be lubricated; a passageway leading from the source of supply to the surface to be lubricated; a wheel hub; and a valve member of the piston type controlling the passage of lubricant through said passageway, in contact with the hub, and adapted to be moved in one direction to one control position by the pressure of the lubricant and in the opposite direction to another control position, by lateral movement of the hub.

WALTER C. ROCKENSTIRE.